United States Patent [19]

Lutz

[11] E Re. 31,060

[45] Reissued Oct. 19, 1982

[54] ARTICLE HANDLING APPARATUS

[75] Inventor: David W. Lutz, Carlisle, Pa.

[73] Assignee: Automatic Truckloading Systems, Inc., Carlisle, Pa.

[21] Appl. No.: 253,115

[22] Filed: Apr. 10, 1981

Related U.S. Patent Documents

Reissue of:

[64] Patent No.: 4,181,460
Issued: Jan. 1, 1980
Appl. No.: 865,763
Filed: Dec. 29, 1977

[51] Int. Cl.[3] ..... B65G 67/08

[52] U.S. Cl. ..... 414/28; 414/36; 414/400

[58] Field of Search ..... 414/28, 36, 398, 400; 198/382, 434, 486

[56] References Cited

U.S. PATENT DOCUMENTS

| | | | |
|---|---|---|---|
| 2,602,554 | 7/1952 | Griffith | 414/36 X |
| 3,511,173 | 5/1970 | Morrow | 198/434 X |
| 3,780,893 | 12/1973 | Lassig et al. | 414/503 X |
| 3,952,887 | 4/1976 | Lutz | 414/392 |
| 3,961,714 | 6/1976 | Buehler | 414/398 X |

*Primary Examiner*—Leslie J. Paperner
*Attorney, Agent, or Firm*—Baker & McKenzie

[57] ABSTRACT

A conveyor, preferably of the roller type, for receiving palletized loads arranged in two parallel rows. The conveyor is arranged in association with a vehicle whereby the palletized loads to be placed on the vehicle are prestaged on the conveyor and the entire load is moved into the vehicle. Palletized loads are placed on the one end of the conveyor by means of a forklift truck or the like and then the palletized loads are aligned and compacted on the conveyor by means of a movable gantry which straddles the conveyor. The gantry is provided with expansible side walls which move laterally inwardly toward the palletized loads to compact and align the loads laterally. Rear gates are swingably mounted on the gantry between open and closed positions. When the gates are closed, they act as a bulkhead to advance the palletized loads on the roller conveyor as the gantry is advanced relative to the conveyor.

20 Claims, 10 Drawing Figures

FIG. 6
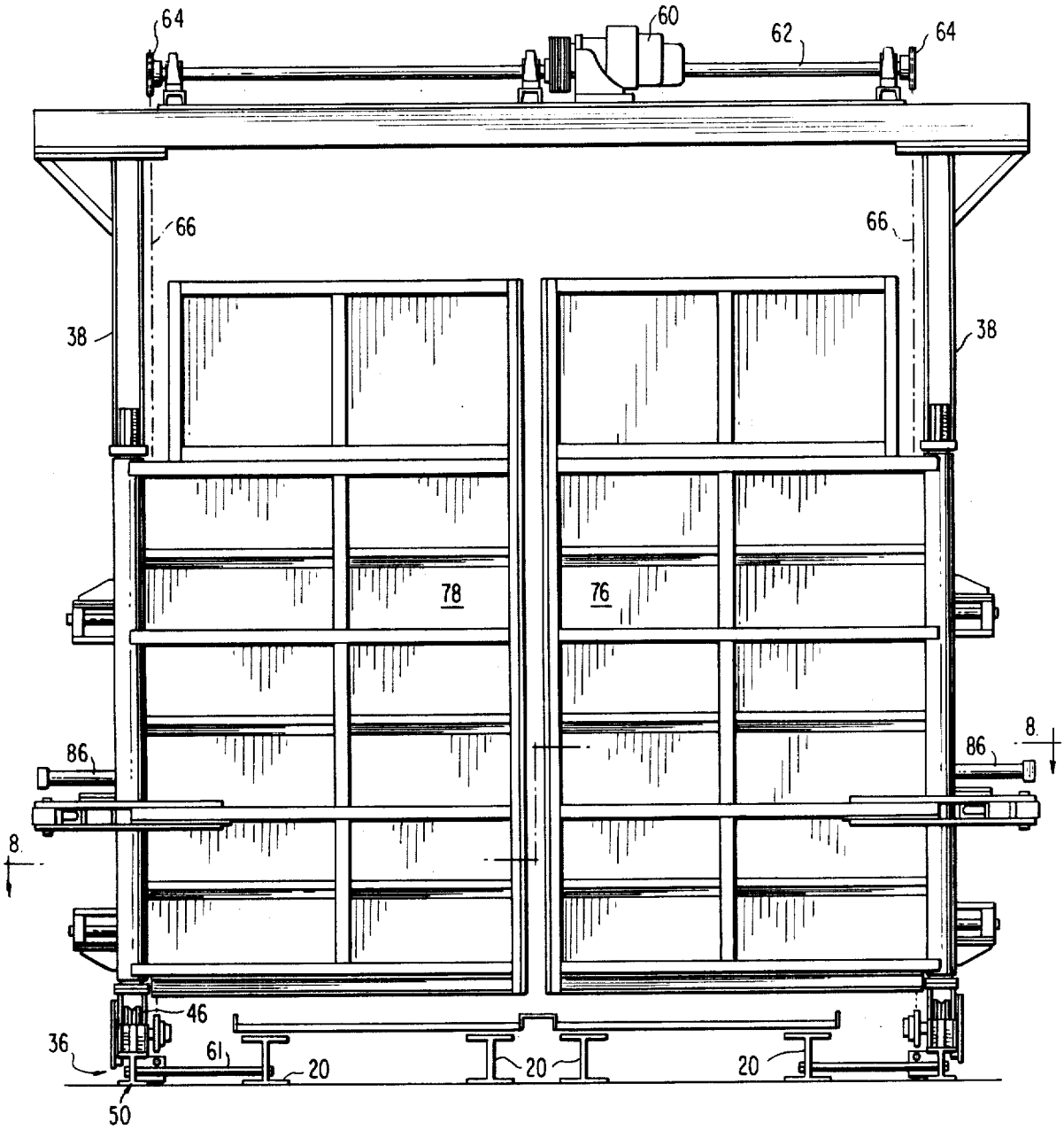
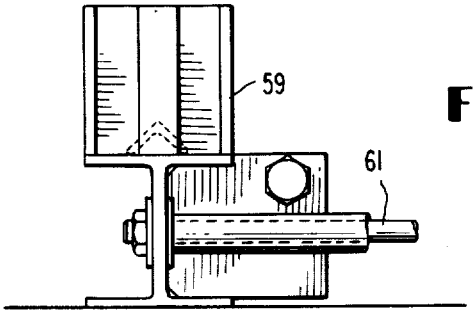
FIG. 7

ARTICLE HANDLING APPARATUS

Matter enclosed in heavy brackets [ ] appears in the original patent but forms no part of this reissue specification; matter printed in italics indicates the additions made by reissue.

This invention relates to an apparatus for loading vehicles such as tractor trailers or the like and, more particularly, relates to conveyors on which loads are prestaged and aligned and compacted prior to being moved into the trailer.

BACKGROUND AND FIELD OF THE INVENTION

There is significant prior art with respect to apparatus for loading vehicles. This invention is primarily useful for prestaging palletized loads. In a related prior art patent, U.S. Pat. No. 3,952,887; dated Apr. 27, 1976 to David E. Lutz, entitled VEHICLE LOADING AND UNLOADING APPARATUS, a vehicle loading and unloading apparatus comprising a longitudinal extensible element having pallet-load-supporting rollers and ground-engaging rollers is disclosed. Palletized loads are placed on the rollers in two parallel rows and the extensible element is moved into the vehicle after an entire vehicle load has been prestaged on the extensible element. The load is then restrained while the frame is withdrawn from beneath the loads to allow the loads to slide off and rest on the floor of the vehicle. It was found that in using the conveyor of that patent that means for aligning and compacting the palletized loads on the conveyor prior to loading the vehicle were desirable. Apparatus for performing those functions is disclosed in this application. It must be emphasized, however, that it is in no way intended that the aligner and compacting apparatus of this invention be limited to use with any one type of conveyor in that the apparatus has many different useful applications not limited to a particular conveyor structure.

SUMMARY OF THE DISCLOSURE

For purposes of this disclosure, the conveyor is substantially similar to that disclosed in the above-mentioned U.S. Pat. No. 3,952,887. The conveyor is illustrated in combination with the load-aligning and compacting apparatus. The conveyor apparatus is not disclosed in great detail; however, reference is made to the disclosure of the aforementioned patent for that purpose. As mentioned earlier, however, it is to be understood that other types of conveyors may be used with the load aligning and compacting apparatus of this invention such as, for example, a standard power-driven roller conveyor.

The load aligner and compacting apparatus consists of a gantry or framework mounted on trackways positioned on each side of the conveyor. The gantry is movable longitudinally relative to the conveyor from a point adjacent the rear end thereof to a point adjacent the front end of the conveyor. As mentioned earlier, the gantry straddles the conveyor and also straddles palletized loads placed on the conveyor. The gantry is provided with a pair of opposed side walls which are movable laterally inwardly toward the loads for engagement with same to properly align the loads on the conveyor. The gantry also includes gates which are swingably mounted at one end thereof between a first or open position to a second or closed position behind the loads on the conveyor.

In use, while the gate is in the open position, loads are placed on the rear end of the conveyor, generally by means of a forklift truck. Two pallets will be placed side by side. Power cylinders move the side walls inwardly toward each other to compact and align the pallet loads relative to the conveyor and, in turn, relative to the vehicle. The gate or gates are then swung to the closed position behind the loads and the gantry is advanced one load length after which it retraces its path back to the start position. The closed gates act as a bulkhead to push the loads one load length. The process is then repeated by setting down another pair of pallets on the conveyor, expanding the side walls to align and compact the loads and then advancing the gantry after the gates have been swung to the closed position. The advancement of the gantry one load length causes all pallets on the conveyor to move one load length and at the same time helps to compact the load in the longitudinal direction. This process is repeated until a full vehicle load is prestaged on the conveyor.

In the context of the conveyor disclosed, which is substantially similar to that disclosed in the U.S. Pat. No. 3,952,887, the conveyor is advanced into the vehicle, whereupon a restraining gate is moved into position to restrain the load while the conveyor is withdrawn from beneath the load.

While disclosed in the context of a conveyor of a particular structure, it is of course to be understood, as mentioned earlier, that the load aligner and compactor is useful with any of a number of different conveyor designs.

With the foregoing in mind, it is a primary objective of this invention to provide an apparatus for loading vehicles comprising means for aligning and compacting loads during a prestaging operation and prior to the loads being moved into the vehicle.

It is a further objective of this invention to provide an apparatus for loading vehicles which is relatively uncomplicated in structure, inexpensive to manufacture and durable in operation.

It is a further objective of this invention to provide an apparatus useful with conveyors, in general, for purposes of aligning, compacting and advancing loads on the conveyor during a prestaging operation.

These and other objects of the invention will become more apparent to those skilled in the art by reference to the following detailed description when viewed in light of the accompanying drawings wherein:

FIG. 6 is a rear view in elevation of a load compactor and aligner of this invention;

FIG. 7 is a view in elevation of the end of one of the tracks which supports the load aligning and compacting apparatus;

FIG. 8a is a view of one of the side walls as shown in FIG. 8 except in the retracted position; and FIG. 9 is a view taken along lines 9—9 of FIG. 8.

DETAILED DESCRIPTION OF THE DRAWINGS

Figure 1:
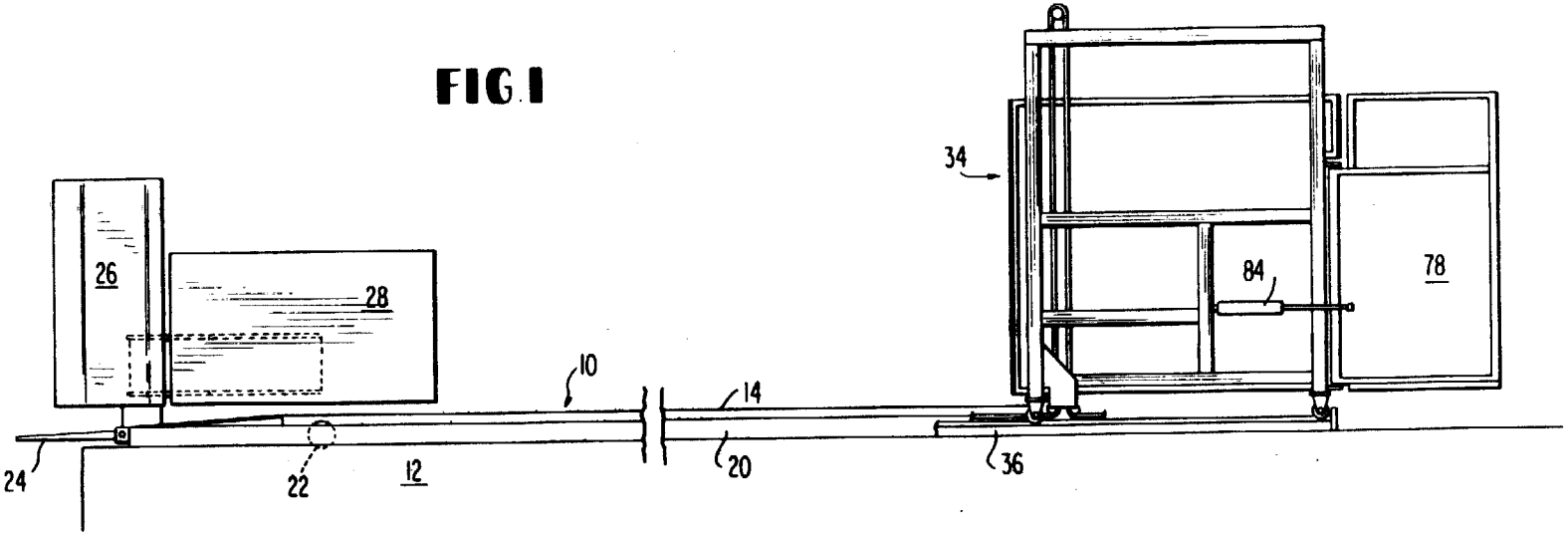
FIG. 1 is a side view in elevation of the load aligner and compactor of this invention in combination with a conveyor.
Figure 2:
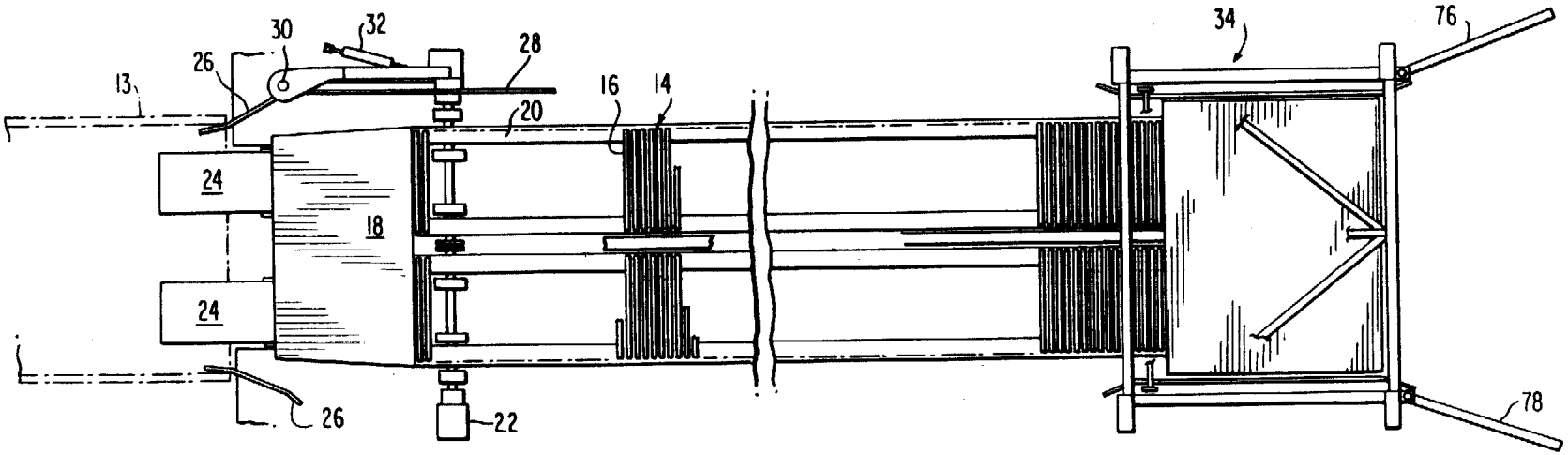
FIG. 2 is a plan view of the apparatus shown in FIG. 1.

Referring now to the drawings wherein like numerals indicate like parts, a conveyor generally indicated by the numeral 10 is mounted on a loading dock 12 which receives a vehicle 13. The vehicle in most instances will be a tractor-trailer rig. The conveyor illustrated in FIGS. 1 and 2 is of the type described in U.S. Pat. No. 3,952,887 mentioned earlier herein. It consists of an extensible element 14 which comprises a series of freely rotating rollers 16 mounted on a suitable framework. The front end of the extensible element has a tapered plate 18. The extensible element 14 is mounted on a base 20 which in turn is mounted on the loading dock 12. Power means 22 when energized causes the entire extensible element 14 to move over transition ramps 24 into the body of the vehicle 13 carrying with it palletized loads arranged on the extensible element usually in two parallel longitudinal rows. The extensible element moves into the vehicle carrying the palletized loads past the guide plates 26 and into the vehicle. A restraining plate 28 is pivotally mounted at 30 to a standard which is positioned on the loading dock and is moved from the open position shown in FIG. 2 to a closed position behind the open door of the vehicle by means of a power cylinder 32. The restraining plate serves to hold the load against rearward movement as the extensible element 14 is withdrawn from the vehicle. The load gently slides off of the tapered plate 18 onto the vehicle floor as the extensible element is withdrawn. This conveyor is part of the prior art to the extent that it is disclosed in the earlier mentioned U.S. Pat. No. 3,952,887.

This invention primarily revolves around the load compactor and aligner or "gantry" generally indicated by the numeral 34. The gantry includes a framework of generally boxshaped configuration which straddles the conveyor 10. It is normally located at the rear end of the conveyor 10. The framework or gantry is movably mounted on trackways 36 which extend parallel to the conveyor 10 on each side thereof.

Figure 3:
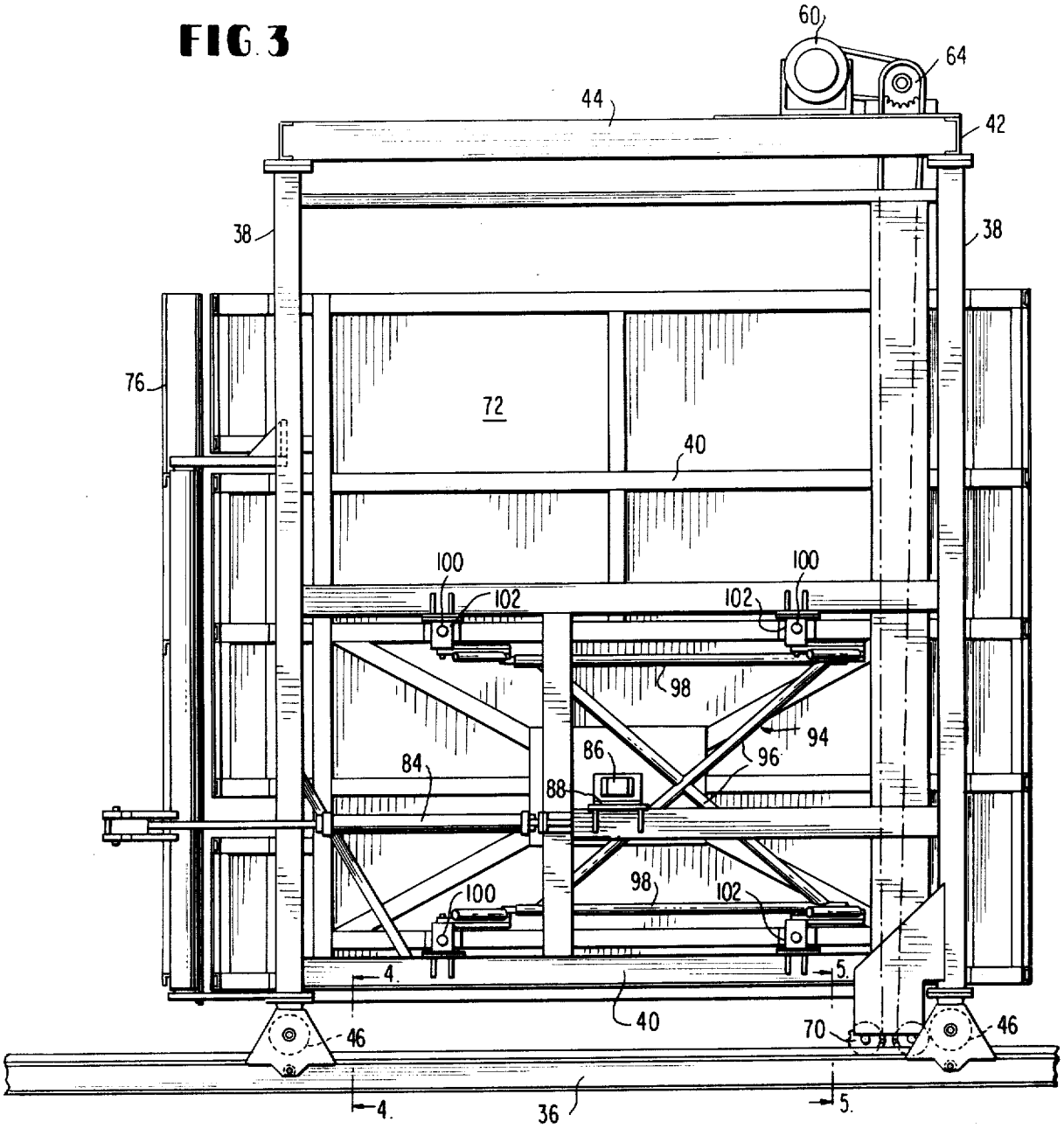
FIG. 3 is a side view in elevation of the load compactor and aligner of this invention.
Figure 4:
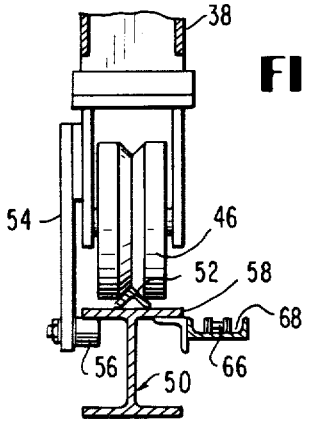
FIG. 4 is a view taken along lines 4—4 of FIG. 3.
Figure 5:
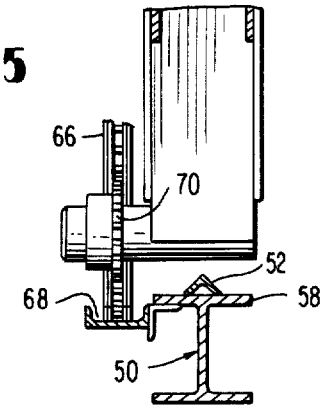
FIG. 5 is a view taken along lines 5—5 of FIG. 3.

More particularly with reference to FIGS. 3 through 5, the gantry consists of vertical side members 38 which are connected by [cross members] *longitudinal beams* 40. The top portion of the gantry or framework consists of *transverse* beams 42 which are spanned by [cross] *longitudinal* beams 44. The opposite side of the gantry is the mirror image of that shown in FIG. 3. Each of the vertical side members 38 has a roller 46 journaled to the lower end portion thereof which roller rides on a trackway 36. The trackway consists of an "I" beam 50 and an inverted angle iron 52 mounted on the upper flange 58 of the "I" beam. [The wheel] *Each roller* 46 has a "V"-shaped groove 52 which mates with the inverted angle iron 52. A retainer 54 extends downwardly from the vertical side member 38 and has a roller 56 thereon which rides on the under surface of the *upper* flange 58. This retainer, of course, prevents the gantry from moving vertically off of the trackway. The end of the trackway 36 is shown in FIG. 7 and includes a stop 59 and a brace and spacer bar 61. The latter is attached to the base 20 of the conveyor as shown in FIG. 6. The trackways *36* run along side the conveyor 10 such that the gantry can be moved from the position shown in FIG. 1 adjacent one of the conveyors to the opposite end of the conveyor for purposes of moving loads along the length of the conveyor.

In a preferred embodiment, the drive means for the gantry includes a reversible drive motor 60, mounted on the top of the framework, which drives a drive shaft 62 that has sprockets 64 at each end thereof. A chain 66 is laid in channel 68 along the side of each of the trackways 36. The chains are fixed at each end of the trackways and each includes a loop that runs past idler sprockets 70 and over sprockets 64. Accordingly, when the motor 60 is actuated, the sprockets 64 will cause a feeding of the chains past the idler sprockets 70 and will cause the gantry to move in either direction over the trackway 36.

Figure 8:
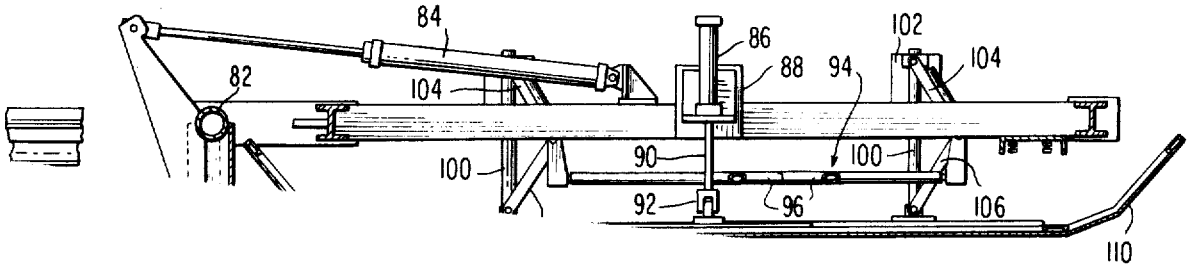
FIG. 8 is a view taken along lines 8—8 of FIG. 6.

The gantry 34 is provided with expansible side walls 72 and 74, as best illustrated in FIGS. 8 and 8a. The gantry also is provided with gates 76 and 78 which are swingably mounted at 80 and 82 respectively for movement between the closed position shown in FIG. 8 to an open position as partially illustrated in FIG. 8a. The gates are moved between the open and closed position by means of power cylinder 84.

The side walls 72 and 74 are caused to move toward each other laterally by means of power cylinders 86 which are mounted in brackets 88 which are attached to the framework of the gantry. The piston rod 90 of the cylinder 86 is attached by connection 92 to the side wall. When the cylinder 86 is actuated, the piston rod 90 extends outwardly, forcing the side wall to the inward position as shown in FIG. 8. The side wall moves evenly and uniformly inwardly as a result of the equalizing frame, generally indicated by the numeral 94. The equalizing frame consists of cross bars 96 which connect upper and lower horizontal bars 98. The side walls each have slide rods 100 affixed to the inner side thereof, which are received in slide mounts 102. The movement of the slide rods 100 is restricted and controlled by the opening and closing of links 104 and 106 which are each pivotally connected respectively to a side wall and a slide mount. Links 104 and 106 are connected to each other at pivot point 108. It is to be understood that each of the sets of links are substantially identical. The equalizing frame insures that the links 104 and 106 of a set for one side wall open and close in an amount equal to that of its counterpart. Accordingly, equal uniform inward movement of the side walls is assured.

The side walls are also provided with leading edge portions 110 which are tapered as shown to guide the loads therethrough.

In operation, palletized loads are placed on the end of the conveyor 10 when the gates 76 and 78 are in the open position as shown in FIGS. 1 and 2. Once the loads have been set on the conveyor, the cylinders 86 are actuated to force the side walls 72 and 74 inwardly toward each other to engage the loads and to compact and align same. The side walls are then retracted [and], the gates 76 and 78 are closed, and the motor 60 is activated to advance the gantry toward the vehicle one full load length. During this movement, the gates 76 and 78 will engage this load and push the loads ahead one load length. The gantry is then retracted, the gates are opened and the cycle is again repeated. As the second set is moved forward, it will also push the first set of loads placed on the conveyor forward. This process is continued until a full truckload is prestaged on the conveyor 10, at which time a completely aligned and fully compacted load is ready for entry into the vehicle. With respect to the conveyor illustrated in drawings 1 and 2, the extensible element 14 is powered by means of drive means 22 into the vehicle [14] *13*, after which the load restraining plate 28 is moved into position to restrain the load as the extensible element 14 is withdrawn from beneath the load.

Other types of conveyors may be employed with the gantry without departing from the scope of the invention. Further, the gantry can be fully automated such that once a load is placed on the conveyor, the weight is sensed [to actuate], the hydraulic cylinders 86 [which actuate] *are actuated to force* the side walls [and then] *inwardly,* the gates are closed, and the gantry is advanced, after which [it] *the gantry* returns to the starting position. All of this can be done automatically to relieve the strain on manpower.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

I claim:

1. Apparatus mounted on a loading dock for loading vehicles, said apparatus comprising:

(a) a conveyor comprising:
- (i) an elongated base mounted on the dock;
- (ii) an elongated shiftable element mounted on said base for movement in a longitudinal path relative to said base and into a vehicle to be loaded;
- (iii) reversible drive means operably connected to said base and said shiftable element to effect said movement; and
- (iv) first means for restraining a load against longitudinal movement while said shiftable element is retracted from beneath said load; and (b) second means for aligning and compacting a load on said shiftable element in the lateral and longitudinal directions prior to loading a vehicle, said second means comprising:
- (i) a framework straddling said conveyor;
- (ii) side walls on said framework on opposite sides of said conveyor;
- (iii) third means for expanding said side walls to laterally align and compact loads placed on said conveyor; and
- (iv) fourth means for moving said framework longitudinally from one end of said conveyor to the other.

2. The apparatus of claim 1 wherein said second means further comprises a gate movable between a first or open position and a second or closed position, said gate when in said closed position extending across said conveyor to provide a bulkhead for engagement with a load on said conveyor, whereby said gate when in its second position is capable of compacting a load in the longitudinal direction and pushing it on said conveyor toward a vehicle to be loaded when said fourth means moves said framework towards the vehicle.

3. The apparatus of claim 1 wherein said second means further comprises fifth means for ensuring that said side walls move together equally and uniformly.

4. The apparatus of claim 1 and further comprising load supporting rollers journaled on said shiftable element.

5. Load handling apparatus for shifting loads from one position to another, said apparatus comprising:

(a) an elongated base;

(b) an elongated shiftable element mounted on said base for movement in a longitudinal path relative to said base;

(c) reversible drive means operably connected to said base and said shiftable element to effect said movement;

(d) first means for restraining a load against longitudinal movement while said shiftable element is retracted from beneath said load;

(e) second means for aligning and compacting a load on said shiftable element in the lateral and longitudinal direction, said second means comprising:
- (i) a framework straddling said shiftable element;
- (ii) side walls on said framework on opposite sides of said shiftable element;
- (iii) third means for expanding said side walls to laterally align and compact loads placed on said shiftable element; and
- (iv) fourth means for moving said framework longitudinally from one end of said shiftable element to the other.

6. The apparatus of claim 5 wherein said second means further comprises a gate movable between a first or open position and a second or closed position, said gate when in said closed position extending across said shiftable element to provide a bulkhead for engagement with a load on said shiftable element, whereby said gate when in its second position is capable of compacting a load in the longitudinal direction and pushing it on said shiftable element from one position to another when said fourth means moves said framework longitudinally of said shiftable element.

7. The apparatus of claim 5 wherein said second means further comprises fifth means for ensuring that said side walls move together equally and uniformly.

8. The apparatus of claim 5 and further comprising load supporting rollers journaled on said shiftable element.

*9. Apparatus mounted on a loading dock for loading vehicles, said apparatus comprising:*

*(a) a conveyor comprising:*
- *(i) an elongated shiftable element mounted on said loading dock for movement in a longitudinal path relative to said loading dock and into a vehicle to be loaded;*
- *(ii) reversible drive means for effecting said movement; and*
- *(iii) first means for restraining a load against longitudinal movement while said shiftable element is retracted from beneath said load and*

*(b) second means for aligning and/or compacting a load on said shiftable element in the lateral direction prior to loading a vehicle, said second means comprising:*
- *(i) a framework mounted on said loading dock;*
- *(ii) side walls on said framework on opposite sides of said conveyor;*
- *(iii) third means for adjusting the position of said side walls in the lateral direction; and*
- *(iv) fourth means for moving said framework longitudinally from one end of said shiftable element to the other.*

*10. Apparatus as recited in claim 9 wherein said second means further comprises a gate movable between a first or open position and a second or closed position, said gate when in said closed position extending across said conveyor to provide a bulkhead for engagement with a load on said conveyor, whereby said gate when in its second position is capable of compacting a load in the longitudinal direction and pushing it on said conveyor toward a vehicle to be*

*loaded when said fourth means moves said framework towards the vehicle.*

*11. Apparatus as recited in claim 9 wherein said second means further comprises fifth means for ensuring that said side walls move together equally and uniformly.*

*12. Apparatus as recited in claim 9 wherein said third means moves said side walls to laterally align and compact loads placed on said conveyor.*

*13. Apparatus as recited in claim 9 wherein said framework straddles said conveyor.*

*14. Apparatus as recited in claim 9 and further comprising load supporting rollers journalled on said shiftable element.*

*15. Load handling apparatus for shifting loads from one position to another, said apparatus comprising:*

*(a) an elongated shiftable element mounted on a base for movement in a longitudinal path relative to said base;*

*(b) reversible drive means for effecting said movement;*

*(c) first means for restraining a load against longitudinal movement while said shiftable element is retracted from beneath said load; and*

*(d) second means for aligning and/or compacting a load on said shiftable element in the lateral direction, said second means comprising:*

*(i) a framework mounted on said base;*

*(ii) side walls on said framework on opposite sides of said shiftable element;*

*(iii) third means for adjusting the position of said side walls in the lateral direction; and*

*(iv) fourth means for moving said framework longitudinally from one end of said shiftable element to the other.*

*16. Apparatus as recited in claim 15 wherein said second means further comprises a gate movable between a first or open position and a second or closed position, said gate when in said closed position extending across said shiftable element to provide a bulkhead for engagement with a load on said shiftable element, whereby said gate when in its second position is capable of compacting a load in the longitudinal direction and pushing it on said shiftable element in the longitudinal direction.*

*17. Apparatus as recited in claim 15 wherein said second means further comprises fifth means for ensuring that said side walls move together equally and uniformly.*

*18. Apparatus as recited in claim 15 wherein said third means moves said side walls to laterally align and compact loads placed on said shiftable element.*

*19. Apparatus as recited in claim 15 wherein said framework straddles said shiftable element.*

*20. Apparatus as recited in claim 15 and further comprising load supporting rollers journalled on said shiftable element.*

* * * * *